UNITED STATES PATENT OFFICE.

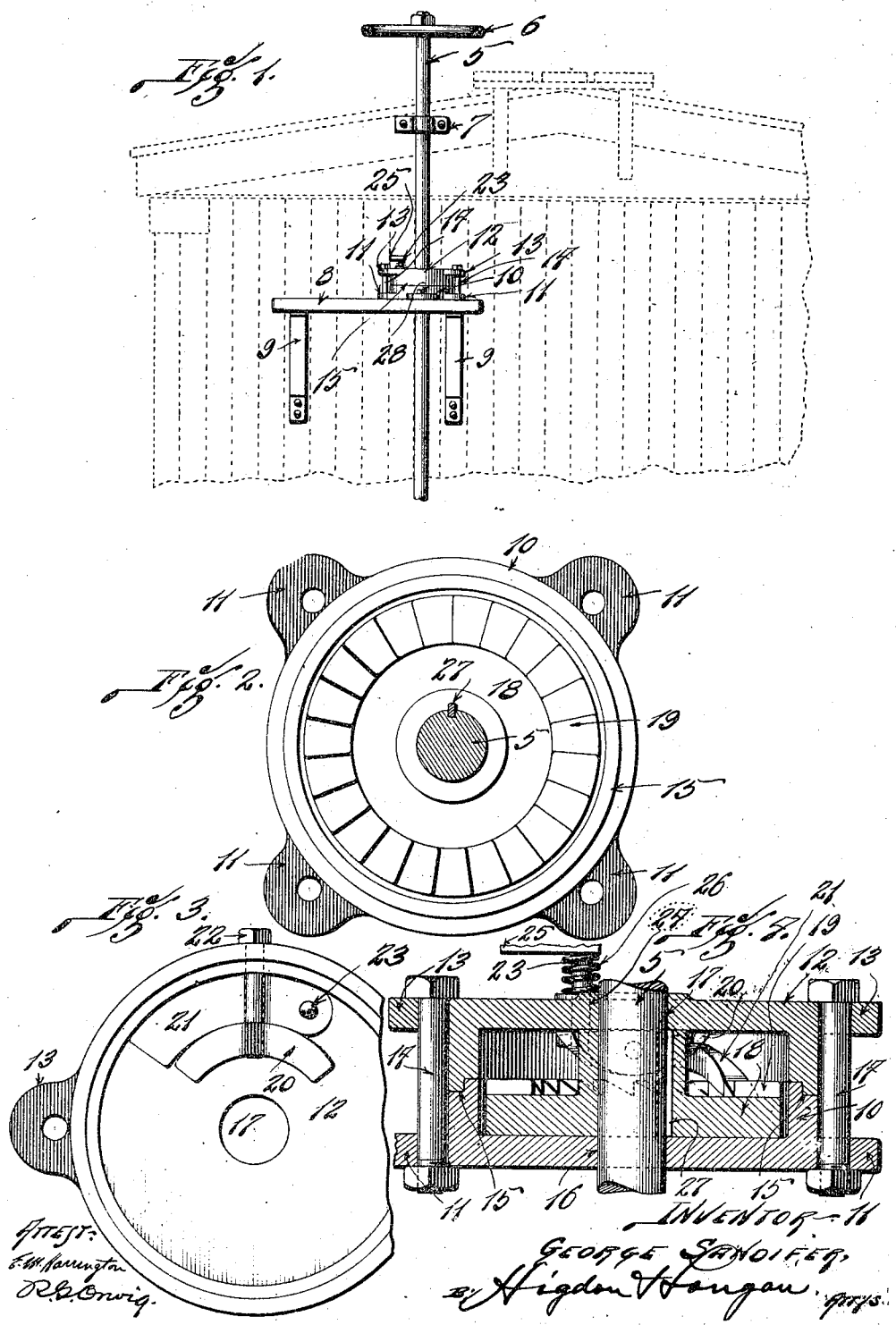

GEORGE SANDIFER, OF MOBERLY, MISSOURI.

BRAKE-RATCHET.

1,145,217.  Specification of Letters Patent.  Patented July 6, 1915.

Application filed October 26, 1914.  Serial No. 868,637.

*To all whom it may concern:*

Be it known that I, GEORGE SANDIFER, a citizen of the United States, and resident of Moberly, Randolph county, Missouri, have invented certain new and useful Improvements in Brake-Ratchets, of which the following is a specification containing a full, clear, and exact description, reference being had to the accompanying drawings, forming a part hereof.

My invention relates to an improved brake ratchet for railway cars, and consists in the novel construction hereinafter described and specifically designated in the appended claims.

The object of my invention is to provide an improved brake ratchet which shall be more efficient than the brake ratchets heretofore known to me, whereby the brakeman or other operator may more perfectly control the hand brakes of railway cars, and the ratchet mechanism will more securely hold the brakes when applied.

In the drawings: Figure 1 is an elevation of my improved brake ratchet as it appears on the end of a freight car; Fig. 2 is a plan view of the ratchet casing with the cover removed therefrom; Fig. 3 is an inverted plan view of the cover; and Fig. 4 is a vertical section of the casing and cover.

The ordinal 5 indicates the usual brake staff, having at its upper end the hand wheel 6, and mounted in the usual bearings 7, so that it is located conveniently for the brakeman. In the present instance I have shown the brake staff with my invention applied thereto, mounted on the end of a freight car, but it is obvious that the brake staff and its connections may be mounted in any other common position, as for instance, on car platforms, as is the case with passenger coaches.

8 indicates a platform or foot rest applied to the end of the car, and supported thereon by means of suitable brackets 9. Mounted upon this platform is the ratchet casing 10, which is preferably cylindrical and provided with a number of perforated ears 11. Said casing 10 is provided with a cover 12, which also has perforated ears 13, and is secured in position upon said casing by means of suitable bolts 14, which pass through the registering perforations of the said ears of both casing and cover. A rabbeted joint 15 is formed upon the meeting edges of the said casing and its cover, for the purpose of excluding rain, snow and sleet from the interior of the casing. The said brake staff 5 passes loosely through a central perforation 16 in the bottom of said casing, and through a central perforation 17 in the said cover. Fixed upon the said brake staff 5 within said casing is a ratchet disk 18, having upon its upper face a series of ratchet teeth 19. Depending from the inner surface of the said cover 12 is a curved or segmental lug 20, preferably cast integral with said cover. Pivotally mounted in the curved vertical space between the said lug and the curved outer wall of the said cover is a pawl 21, which is curved to conform to the curvature of the segmental lug 20 and the curved wall of said cover. Said pawl is pivotally mounted intermediate of its ends upon a suitable pivot which in the present instance is in the form of a bolt 22, which is passed through an aperture in the vertical wall of said cover, and through a perforation in the said pawl, and into a perforation formed in the said segmental lug. By this means the said pawl 21 is mounted in a position above the said teeth 19 of the said ratchet disk, and with one end of said pawl in engagement with said teeth. The end of the said pawl 21 which is in engagement with the said teeth, has a greater weight than its opposite ends, so that said heavier end of said pawl will normally rest in contact with said teeth. The said pawl 21 is released from the said teeth by the foot of the brakeman or operator pressing downwardly upon a pedal pin 23, which operates loosely in an opening 24 formed in the said cover 12, and has its lower end connected to the end of said pawl 21, which is opposite its tooth engaging end. The said pedal pin 23 projects upwardly a distance above the top of said cover 12, and has upon its upper end a lateral projecting portion 25 beneath which the brakeman may insert his toe, in order to lift the said pin should it become frozen or stuck. A spring 26 is coiled around the projecting portion of said pedal pin 23, and its lower end rests upon a common washer, placed upon the upper surface of the said cover 12 while the upper end of said spring bears against the said lateral projection 25 of the said pedal pin and normally tends to lift the said pin and assist in holding the said pawl 21 in engagement with the teeth of the said ratchet disk 18. The said casing 10 is fixed to said platform by bolts 28. The said ratchet disk 18 is preferably fixed upon the said brake-staff by means of a short key 27, set in suitable key-ways formed in the said disk and in the said brake staff; and the ends of the said key 27 abut against the bottom of the said casing 10 and the top of the said casing cover 12, during operation, and thereby effectually prevent said key from sliding endwise out of its key-ways and being accidentally lost and releasing the said ratchet-disk from said brake-staff.

Heretofore, the keys of brake-shafts have often become loosened after use, and have been lost, permitting the ratchet wheels to become loose on their brake-staffs, with the result that the brakes have been rendered useless, and accidents have been caused thereby. Furthermore, in old style ratchets and pawls, the brake-staff sometimes moved axially and carried the ratchet wheel out of engagement with the pawl, and thereby accidentally released the brakes. My improved construction effectually locks the key in position within the casing, prevents axial movement of the brake staff, and entirely obviates accidents which have heretofore rendered the brake-staff and its ratchet wheel inoperative by axial movement of the staff and loosening of their key.

I do not limit myself to the exact construction of parts shown in the drawing, as it is obvious they may be altered by skilled workmen without departing from the scope of my invention.

The operation of my invention is obvious to skilled railway trainmen, and need not be further explained. Its principal advantage lies in its greater efficiency in holding the brake applied and in preventing the shaking loose of the pawl from the ratchet and the accidental release of the brakes.

I claim:

1. The combination with a brake staff of a suitable casing having perforated ears, a ratchet disk having teeth upon its upper face and fixed upon said brake staff within said casing, a suitable cover having upon its interior a depending curved lug, a curved pawl pivotally mounted in the curved vertical space between curved outer wall of said curved lug and the said cover, suitable bolts for securing said cover upon said casing, and for securing the casing to the car, and a pedal pin projecting through an opening in the said cover and engaging one end of said pawl.

2. The combination with a brake staff of a suitable casing having perforated ears, a ratchet disk having teeth upon its upper face and fixed upon said brake staff within said casing, a suitable cover having upon its interior a depending curved segmental lug, a curved pawl pivotally mounted in the space between said lug and the said cover, suitable bolts for securing said cover upon said casing, and for securing the casing to the car, a pedal pin projecting through an opening in the said cover and engaging one end of said pawl, and a lateral projection upon the upper end of said pedal pin, whereby the toe of the brakeman may lift said pedal pin.

In testimony whereof, I have signed my name to this specification, in presence of two subscribing witnesses.

GEORGE SANDIFER.

Witnesses:
E. L. WALLACE,
JOHN C. HIGDON.